United States Patent [19]

Moorefield, II

[11] 3,789,587

[45] Feb. 5, 1974

[54] APPARATUS FOR SEPARATING MATERIAL FROM A PNEUMATIC CONVEYOR

[75] Inventor: James F. Moorefield, II, Blairs, Va.

[73] Assignee: Loew's Theaters, Inc., New York, N.Y.

[22] Filed: May 10, 1971

[21] Appl. No.: 141,802

[52] U.S. Cl................. 55/290, 55/294, 55/302, 55/317, 55/354, 55/357, 55/424, 55/430, 55/473, 55/481, 55/502, 55/525, 209/307, 210/400, 302/59

[51] Int. Cl............................................. B01d 46/22

[58] Field of Search..... 55/290, 351, 352, 353, 354, 55/481, 294, 302, 317, 357, 424, 430, 473, 502, 525; 210/387, 400, 401, 160; 209/272, 307, 308; 302/59

[56] References Cited
UNITED STATES PATENTS

| | | | |
|---|---|---|---|
| 1,026,432 | 5/1912 | Dey | 209/307 X |
| 1,888,001 | 11/1932 | Hicks | 55/354 X |
| 2,211,812 | 8/1940 | Colbert | 55/290 |
| 3,019,855 | 2/1962 | Engle | 55/352 |
| 3,233,391 | 2/1966 | Olsen | 55/290 |
| 3,375,638 | 4/1968 | Dungler | 55/116 |
| 1,815,306 | 7/1931 | Lawrence | 55/354 X |
| 2,256,665 | 9/1941 | Carson | 55/351 X |
| 3,463,723 | 3/1949 | Spraragen | 210/387 X |

FOREIGN PATENTS OR APPLICATIONS

385,397    3/1965    Switzerland.......................... 55/290

Primary Examiner—Dennis E. Talbert, Jr.
Attorney, Agent, or Firm—Brumbaugh, Graves, Donohue & Raymond

[57] ABSTRACT

A device for separating material from a pneumatic conveyor. The pneumatic conveyor includes a duct, which is preferably rectangular in cross-section, for conveying material entrained on a stream of air. The material separator device is interposed in a straight section of the conveyor duct and operates to remove the material conveyed in the duct while permitting the passage of air. The separator device comprises an air-permeable endless belt arranged to traverse the passageway through the duct and drive means for continuously moving the endless belt across the passageway.

16 Claims, 7 Drawing Figures

FIG. 1

INVENTOR.
JAMES F. MOOREFIELD, II his ATTORNEYS

INVENTOR.
JAMES F. MOOREFIELD, II

FIG.5

APPARATUS FOR SEPARATING MATERIAL FROM A PNEUMATIC CONVEYOR

BACKGROUND OF THE INVENTION

The present invention relates to apparatus for separating material from a pneumatic conveyor.

Pneumatic conveyors are frequently used in material processing plants and installations or on machinery for conveying any material which can be entrained on a stream of gas or air. Such material, such as paper, cardboard, soybeans, grain, feathers, tobacco, cotton and the like is drawn into a duct or tube by means of suction which is established by a fan or blower, normally connected to the opposite end of the duct. After the material has been conveyed through the duct to the point desired (e.g., to a storage bin or to a processing machine) it is necessary to provide a separating device or terminus which will remove the material from the duct or, in other words, separate the material from the stream of gas or air.

There are a number of reasons why it is advantageous to separate the material from the stream of gas or air:

1. If the material is allowed to pass through a fan or blower connected along the passageway of the conveyor duct, it greatly adds to the wear of the blades and bearings of the fan or blower and, in turn, it is chopped or broken by the force of the blades.

2. If the material is allowed to emerge from the end of the duct together with the stream of gas or air, the force with which it is blown causes dust and other problems which are detrimental to persons who must operate the equipment as well as to the material itself.

Another reason for the necessity for a terminus, in certain cases, is that the gas or air which is used to convey the material must be recycled; that is, after the material has been discharged from the conveyor, the gas or air is introduced again at the beginning of the duct to convey additional material through the duct. This recycling is particularly useful when the gas or air must be of a particular composition, temperature, humidity or the like. It is also useful in cases where the material is dusty or it is otherwise difficult to remove pollutants from the gas or air. In addition, the efficiency of the fan or blower is improved when the gas or air is driven around a closed loop.

Various types of separating devices have been devised in the art to remove material from a gas or air stream that is passed through a pneumatic conveyor. Separators with bag filters are useful for removing grains from an airstream. For other materials, particularly those comprising particles and pieces of relatively large size, a gravity separating device is conventionally used. Such a gravity device which, for example, may be a cyclone or some variation thereof, is normally provided with an opening at or near the top for the escape or exit of the gas or air and provided with an air lock at the bottom which permits the material to be removed without permitting the entrance of air. A continuously rotating paddle wheel, which is enclosed on all sides except at the top and bottom, is often used as an air lock because of the positive action which it exerts in drawing the material downward out of the separating chamber.

There are, however, a number of disadvantages associated with these known devices for separating material from a pneumatic conveyor:

1. the separating filters or the gravity chambers must be large in size relative to the cross-section of the pneumatic conveyor duct to permit adequate flow through of the stream of air without inhibiting separation.

2. the air lock — particularly the paddle wheel type air lock — at the bottom of a separating device is of limited capacity and cannot handle material which is greater than a certain length.

3. the use of a cyclone-shaped chamber requires that the exit point of the material be much smaller than the width of the penumatic conveyor duct. Thus, if a subsequent processing station requires the material to be evenly spread across the entire width of the entry thereto, it is necessary to redistribute the material across this width.

SUMMARY OF THE INVENTION

An object of the present invention, therefore, is to provide a device for separating material from a pneumatic conveyor which does not exhibit the various disadvantages of the prior art devices noted above.

This object, as well as other objects which will become apparent in the discussion that follows, is achieved, according to the present invention, by interposing, in a rectilinear portion of the duct of the pneumatic conveyor, a gas-permeable endless belt which traverses the passageway of the duct and by providing drive means for continuously moving the endless belt across the passageway. This apparatus permits the material entrained on the stream of gas or air in the passageway of the duct to be conveyed out of the passageway while permitting the stream of gas to continue through the passageway without interruption.

In a preferred embodiment of the material separating device according to the present invention, the gas-permeable endless belt is constructed of wire mesh and arranged with its material contacting surface at an angle in the range of 20° to 80° with respect to the longitudinal axis of the pneumatic conveyor. This angular arrangement allows the endless belt to present a larger surface to the stream of gas or air and to the material which is passed through the pneumatic conveyor and removes the material from the path of the stream of gas or air without causing it to execute a 90° turn. Depending upon the material, such a sharp change in direction of motion may cause it damage; e.g., as in the case of tobacco, by tearing or breaking the leaves.

As the angle between the surface of the endless belt which is presented to the material passed through the pneumatic conveyor and the longitudinal axis of the pneumatic conveyor approaches 80°, the endless belt may be made shorter in length but the material is required to execute an increasingly sharper turn upon impact with the belt. Conversely, as the angle between the surface of the endless belt and the axis of the pneumatic conveyor is decreased to 20°, the length of the endless belt must be increased to traverse the width of the pneumatic conveyor duct, but the material impinging on the endless belt exhibits a correspondingly less violent encounter. A suitable compromise between these two extremes may be made by arranging the material contacting surface of the endless belt at an angle of approximately 45° with the longitudinal axis of the conveyor duct.

According to a further feature of the present invention, the endless belt is driven at such a speed that the forward motion of the material along the longitudinal axis of the pneumatic conveyor remains approximately constant even as the material is removed from the conveyor duct via the endless belt. For example, in the case where the surface of the endless belt upon which the material impinges is arranged at an angle of 45° with the longitudinal axis of the conveyor duct, and where the material is moved through the pneumatic conveyor in the direction of its longitudinal axis at a speed $s$, the surface speed of the endless belt is preferably in the range of $s$ and $s\sqrt{2}$, where $s\sqrt{2}$ is the length of the hypothenuse of a right-angle 45° triangle having sides $s$ in length.

According to another feature of the present invention the endless belt is held in position across the passageway of the pneumatic conveyor duct by two rollers arranged on opposite sides of the passageway. These rollers are spaced apart in parallel relationship by brace members which extend between the rollers at both ends thereof. These brace members, in turn, are arranged to slide along rails connected on opposite sides of the penumatic conveyor duct and may be locked in a particular position along the rails during operation.

With this arrangement, it is possible to quickly insert or remove the endless belt, the two rollers and the brace members as a unit, thereby permitting fast replacement of the endless belt if it becomes damaged or clogged.

A still further feature of the present invention is a "vacuum cleaner" arrangement for removing particles of material which penetrate the first gas-permeable surface of the endless belt and become trapped inside the belt. Because of the gas or air stream flow, particles of material which pass through the first encountered surface of the belt will impinge against and either pass through or remain in contact with the inside of the second surface thereof which is downstream of the first surface. These particles may be removed by means of a suction housing arranged inside the endless belt adjacent to this second surface. By establishing a lower pressure in the suction housing relative to the pressure immediately surrounding the suction housing, the particles which enter the housing may be withdrawn to prevent possible clogging of the endless belt rollers.

The material separating device according to the present invention exhibits a number of important advantages visavis the filter and gravity type separating devices of the prior art. These are:

1. The ability to handle large quantities of material, thus permitting separation of any batches or "slugs" which may be passed through the pneumatic conveyor;
2. Minimum space requirements (the separating device can be housed in a space which is only slightly larger than the conveyor duct itself);
3. The ability to handle material of any size or length;
4. The ability to separate without bunching the material, thus avoiding the necessity of spreading out the material for subsequent processing; and
5. The ability to separate without reversing the direction of flow of the material, thus minimizing material breakage or damage.

All of these advantages are made possible by the separating device according to the present invention without a commensarate increase in the cost of manufacture over the devices previously known in the art. The separating device according to the present invention is characterized by a simplicity of design which not only advantageously affects the cost of its construction but also ensures maintenance-free operation.

DESCRIPTION OF THE PREFERRED EMBODIMENTS

The preferred embodiments of the present invention will now be described with reference to FIGS. 1 – 7 of the drawings. Identical elements of the apparatus shown in FIGS. 1 – 7 are designated by the same reference numerals.

Figure 1:
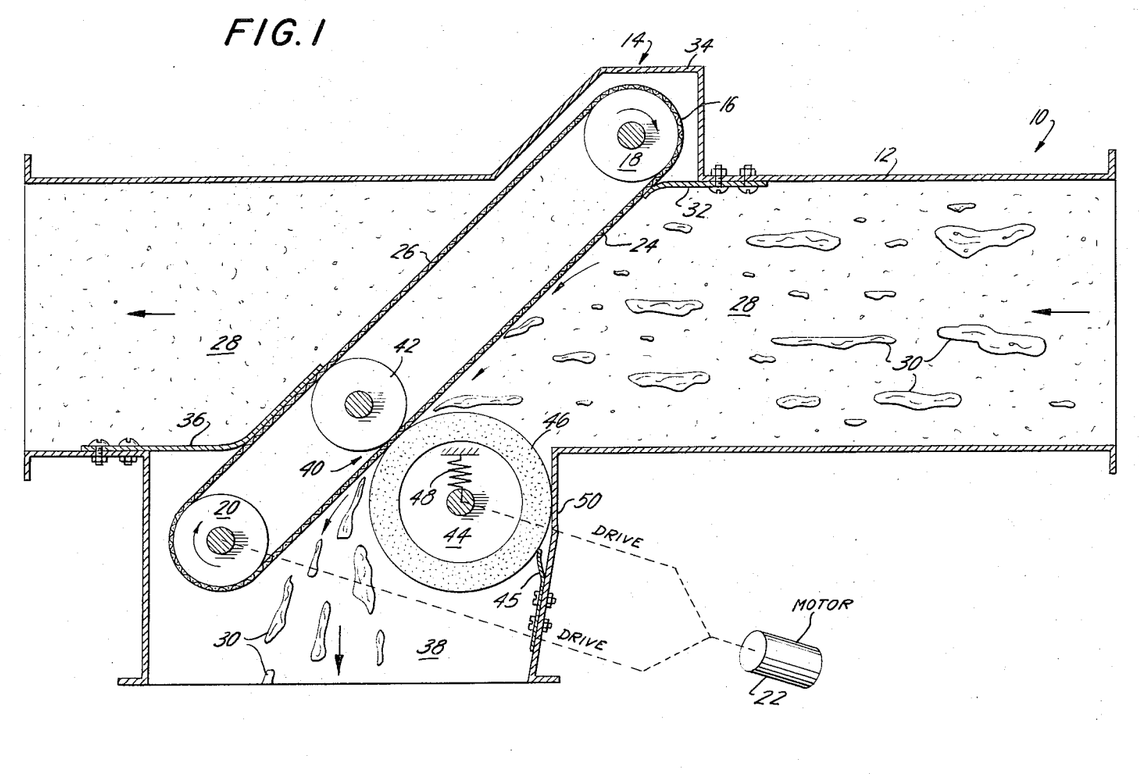
FIG. 1 is an elevational view, partly representational and partly in cross-section, of a material separating device, according to the preferred embodiment of the present invention, interposed in the duct of a straight-through pneumatic conveyor.

FIG. 1 shows a pneumatic conveyor 10 formed by a straight rectangular duct 12 constructed, for example, of sheet metal or plastic. Interposed in the conveyor is a material separating device 14 comprising essentially a gas permeable endless belt or apron 16 arranged to move about rollers 18 and 20, and a drive motor 22 connected to rotate the roller 20. The endless belt 16, which is preferably equal in width to the width of the conveyor duct 12, thus forms two segments 24 and 26 which traverse the passageway 28 of the duct.

The material 30 which is entrained on a stream of gas or air and thereby conveyed through the passageway 28 inpinges on the first exposed segment 24 of the endless belt 16. Upon contact with the belt it is maintained in position by the gas or air which continually passes through the belt and continues down the passageway 28. Some particles of the material 30 which are too small to be captured by the endless belt pass through the openings in the belt and also continue down the passageway.

The gas-permeable endless belt is preferably constructed of wire mesh having openings of suitable size for the particular material 30 which is to be conveyed and separated. The coarser the material, the larger the openings should be since larger openings provide lesser resistance to the flow of gas or air.

As shown in FIG. 1 the segment 24 of the endless belt is arranged at an angle of 45 degrees with respect to the longitudinal axis of the conveyor duct 12. This angle increases the surface area of the belt presented to the conveyed material 30 and reduces the damage or breakage which may be caused to the material when it impinges on the surface of the segment 24. In order to further minimize this damage or breakage, which is due to the sudden deceleration of the material 30 when it contacts the segment 24, it is preferable to drive the endless belt at a speed which will minimize this deceleration. To accomplish this, the endless belt should be driven with a surface speed which lies between the absolute speed of the material and a higher speed which depends upon the angle the belt surface makes with the longitudinal axis of the conveyor duct. This higher speed is such that the component of the speed of the conveyed material in the direction of the longitudinal axis of the conveyor duct will remain constant before and after the material impinges on the surface of the belt segment 24.

To ensure that the stream of gas or air flows through the passageway 28 and passes through the two segments 24 and 26 of the endless belt 16, the separating device according to the present invention is provided with seals to prevent the entrance or escape of the gas or air to or from the surrounding atmosphere respectively, and to prevent the stream of gas or air from bypassing the endless belt.

A friction seal 32, having a sliding surface made of flexible material such as rubber or plastic, is provided at the upper portion of the endless belt to prevent the stream or gas or air from by-passing the belt via the region between the upper roller 18 and the shroud 34. This seal 32 can be arranged in sliding contact with the endless belt at any point along the upper region thereof; for example, along the upper portion of the segment 26, along the curved portion which surrounds the roller 18 or, as shown, along the upper portion of the segment 24.

A further seal 36, in this case also a sliding seal, is arranged along the lower left-hand portion of the endless belt to prevent the entrance or escape of gas or air through the material exit opening 38. The seal 36 is extended upward to completely cover that portion of the segment 26 of the endless belt through which the gas or air could pass.

A third seal 40, is arranged at the lower portion of the segment 24 of the endless belt. This seal, which is formed of the rollers 42 and 44, functions to withdraw the material 30 from the passageway 28 while preventing the entrance or escape of gas or air. Although the material 30 will be maintained in contact with the segment 24 by the flow of gas or air as it is drawn out of the passageway 28, it immediately falls free of the endless belt, as shown in FIG. 1, after passing through the seal 40. A small wiper 45 may be provided, if necessary, to remove any material which has a tendency to stick to the roller 44.

The roller 44 is driven by the motor 22 in a direction counter to the direction of rotation of the roller 20 so that its surface velocity will be identical to the surface velocity of the segment 24 of the endless belt. To permit the roller 44 to pass the material 30 without allowing entrance or escape of gas or air, its outer surface 46 is made of soft resilient material such as foam rubber or polyurethane plastic foam or is provided with a cavity or cavities which are inflated with air. To provide additional "give" in the event that a batch or "slug" of material is passed through the seal, the roller 44 is resiliently mounted, for example, by means of tension springs 48 connected to the bearings on either side thereof, and can move downward to open a space between its surface and the surface of the segment 24 of the endless belt. During normal operation the tension springs 48 serve to maintain the surface of the roller 44 in intimate contact with the segment 24 of the endless belt and the shroud 50 of the material exit duct.

Figure 2:
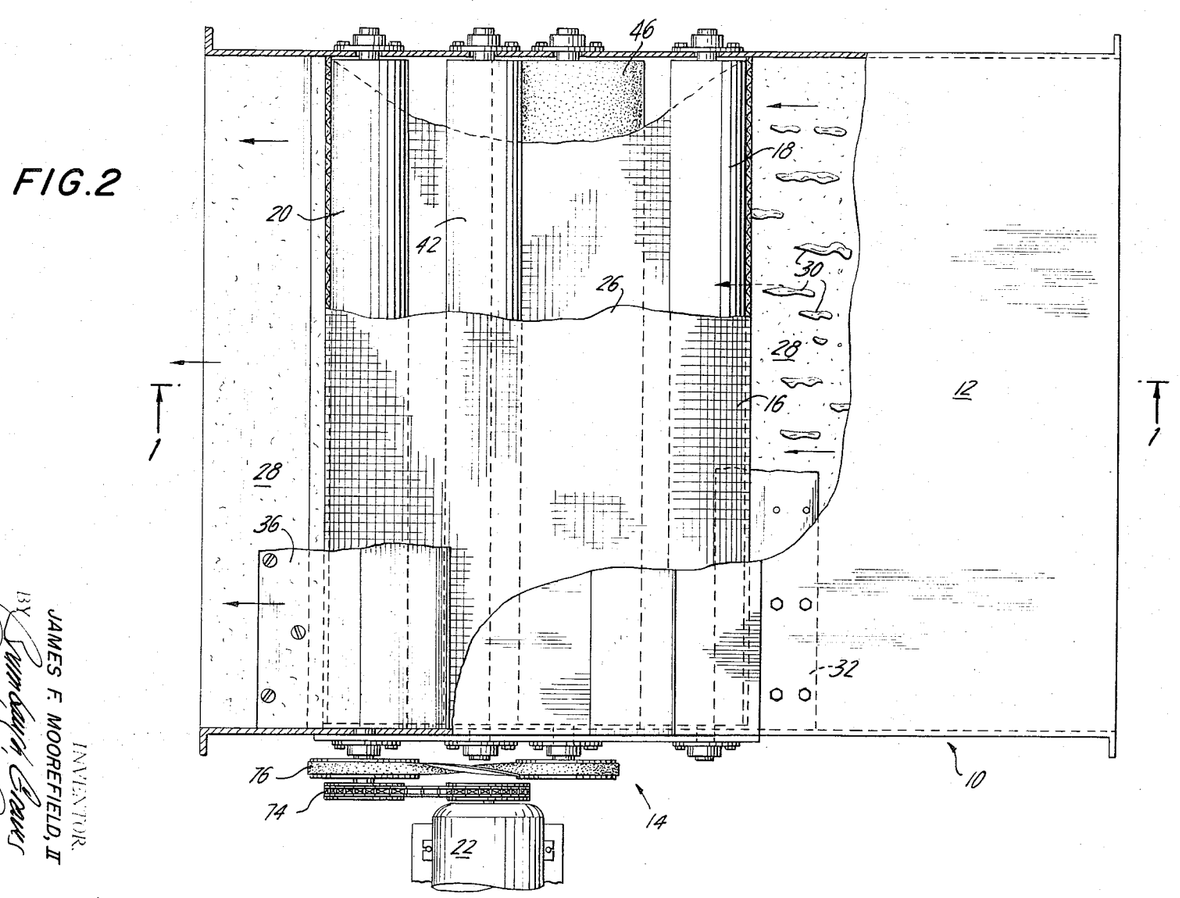
FIG. 2 is a top view, partly in cross-section, of the material separating device of FIG. 1.
Figure 3:
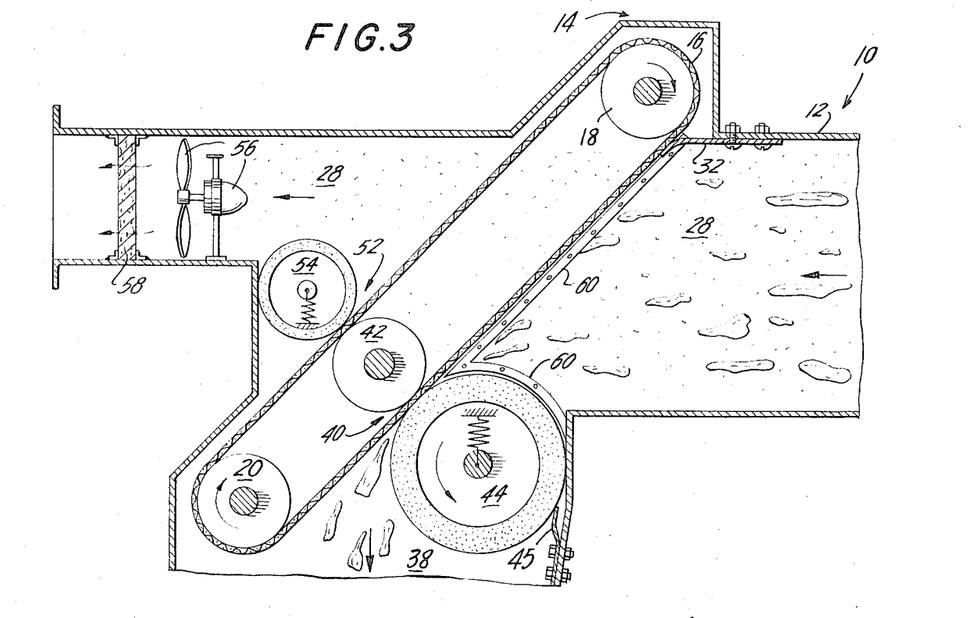
FIG. 3 is an elevational view, partly representational and partly in cross-section, of a material separating device incorporating a roller-type seal in accordance with a particular feature of the present invention.

FIGS. 3 – 7 show a number of features or modifications according to the present invention which may be used with the basic apparatus shown in FIGS. 1 and 2. In FIG. 3, the wiper seal 36 in FIGS. 1 and 2 has been replaced by a second roller-type seal 52 similar to the seal 40. This seal 52 is formed by the roller 42 and a second resiliently mounted roller 54. Like the roller 44, the roller 54 may also be covered with soft or resilient material.

Since the passageway 28 through the pneumatic conveyor duct does not carry material in the region to the left of the endless belt 16, this passageway can be narrowed considerably as shown in FIG. 3. This narrowed portion may be constructed to provide the necessary shrouding for a blower 56 of any suitable type. If the stream of air is to be expelled directly into the atmosphere, it may be necessary to add a filter 58 to remove the particles of dust which may penetrate the endless belt 16.

Finally, FIG. 3 also shows an additional seal 60, attached to the vertical side of the duct 12, which prevents material, gas or air in the passageway 28 from passing by the edge of the belt 16 or the roller 44. This seal may also be made of soft material such as foam rubber or plastic or may be constructed as a wiper seal such as seal 32 and made of harder but flexible material.

Figure 4:
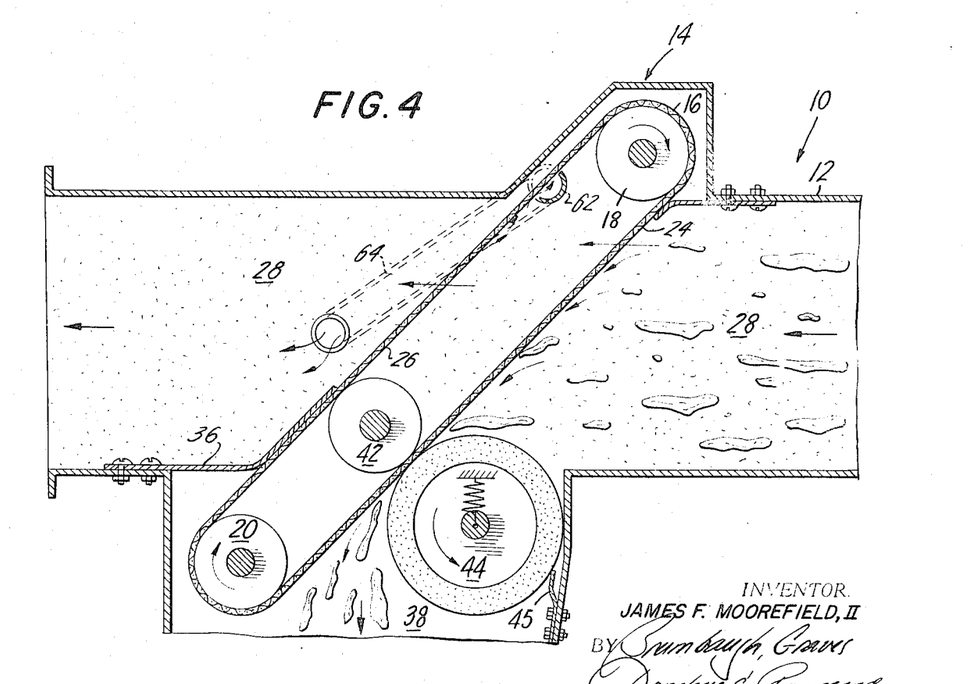
FIG. 4 is an elevational view, partly representational and partly in cross-section, of a material separating device incorporating a suction arrangement for cleaning the endless belt in accordance with a particular feature of the present invention.
Figure 5:
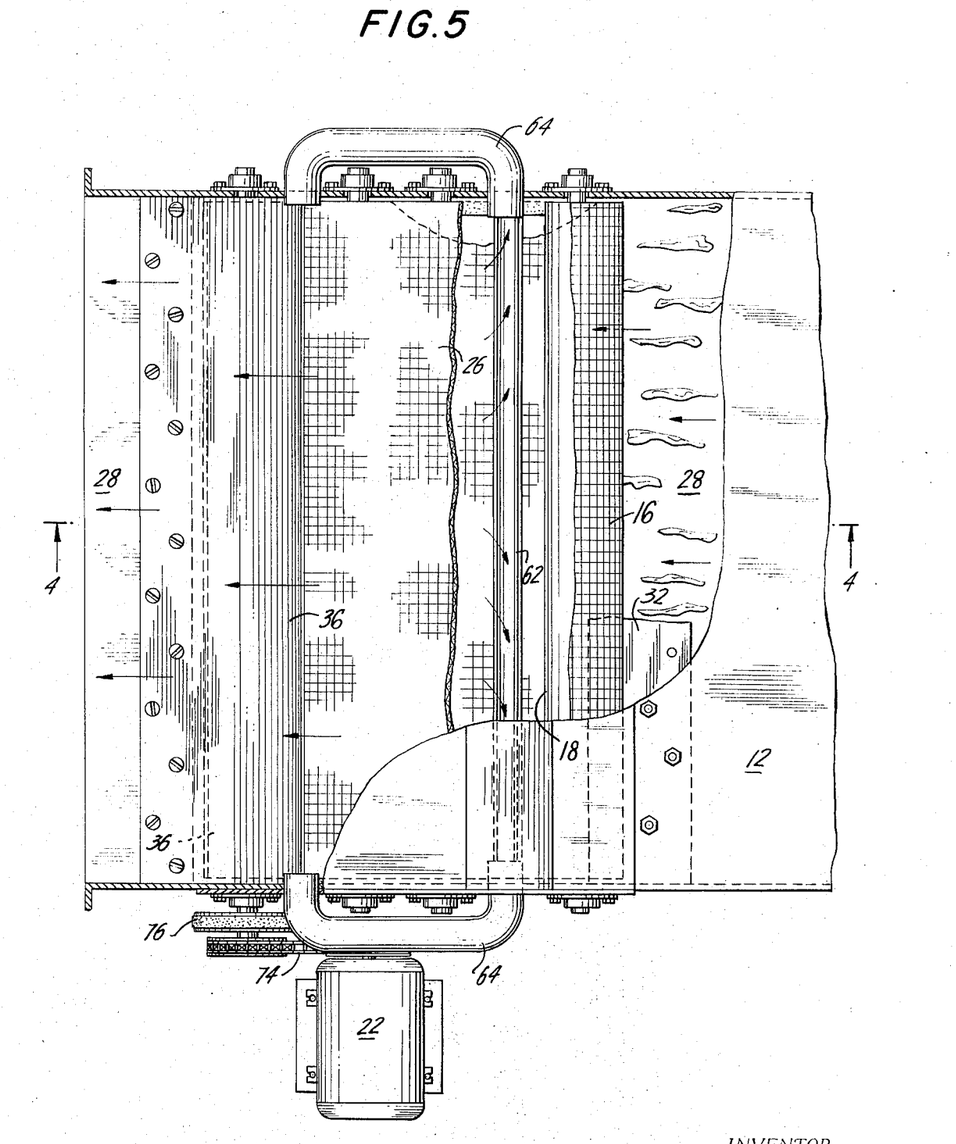
FIG. 5 is a top view, partly in cross-section, of the material separating device shown in FIG. 4.

FIGS. 4 and 5 illustrates a "vacuum cleaning" device for removing small particles of material which pass through the segment 24 of the endless belt 16 but are trapped inside the belt by the segment 26. This may occur, for example, with needle-shaped particles which penetrate lengthwise the segment 24 and then lie flat against the segment 26.

The vacuum cleaning device essentially comprises a housing 62 arranged adjacent to the upper end of the segment 26 of the endless belt. A source of low pressure is connected to this housing 62 to draw off the particles of material as they move upward on the surface of the segment 26. If a suction fan or blower is connected to the passageway 28 at the exit side thereof the region of the passageway 28 to the left of the segment 26 will be maintained at a lower pressure than the region between the segments 26 and 24. In this case, it is possible to establish the suction in the housing 63 by connecting the ends of this housing via tubes 64 to the region of the passageway 28 to the left of the segment 26.

Figure 6:
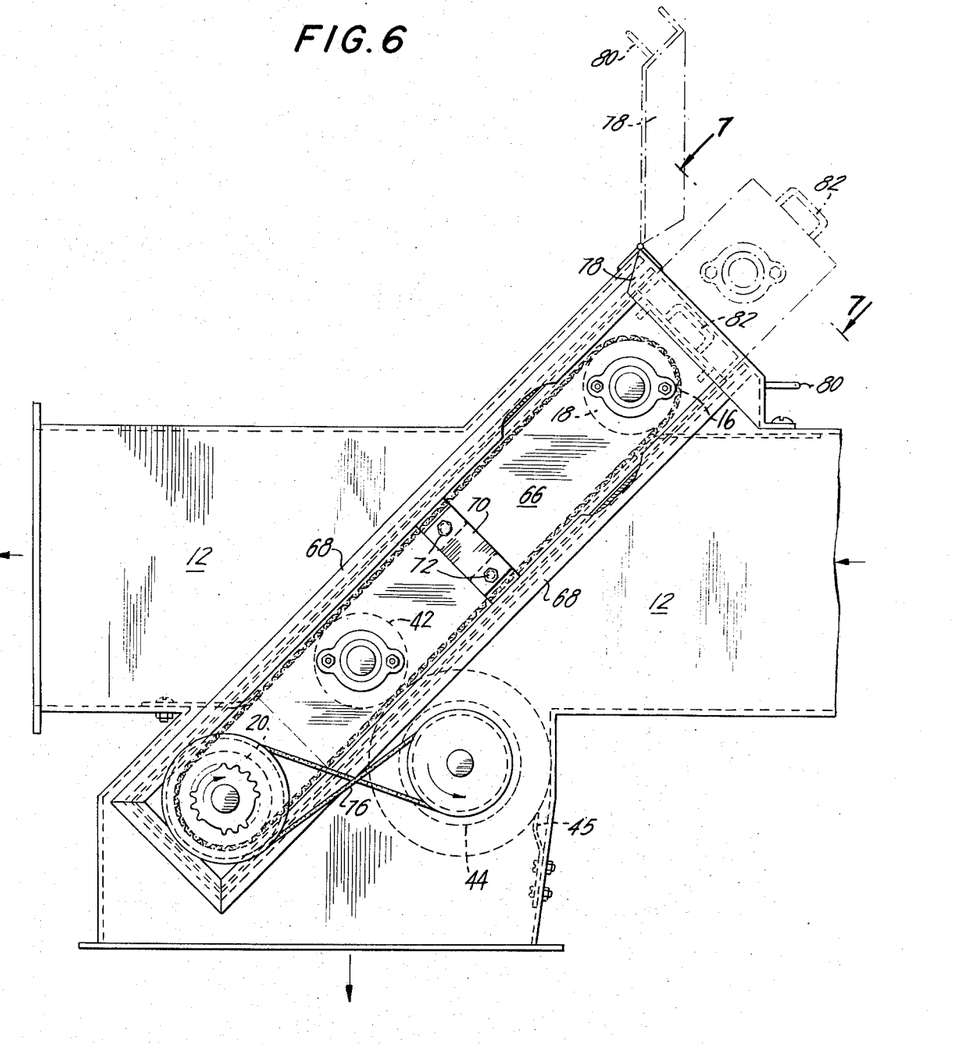
FIG. 6 is an elevational view, partly in cross-section, of a material separating device incorporating means for quick replacement of the endless belt and roller unit in accordance with a further particular feature of the present invention.
Figure 7:
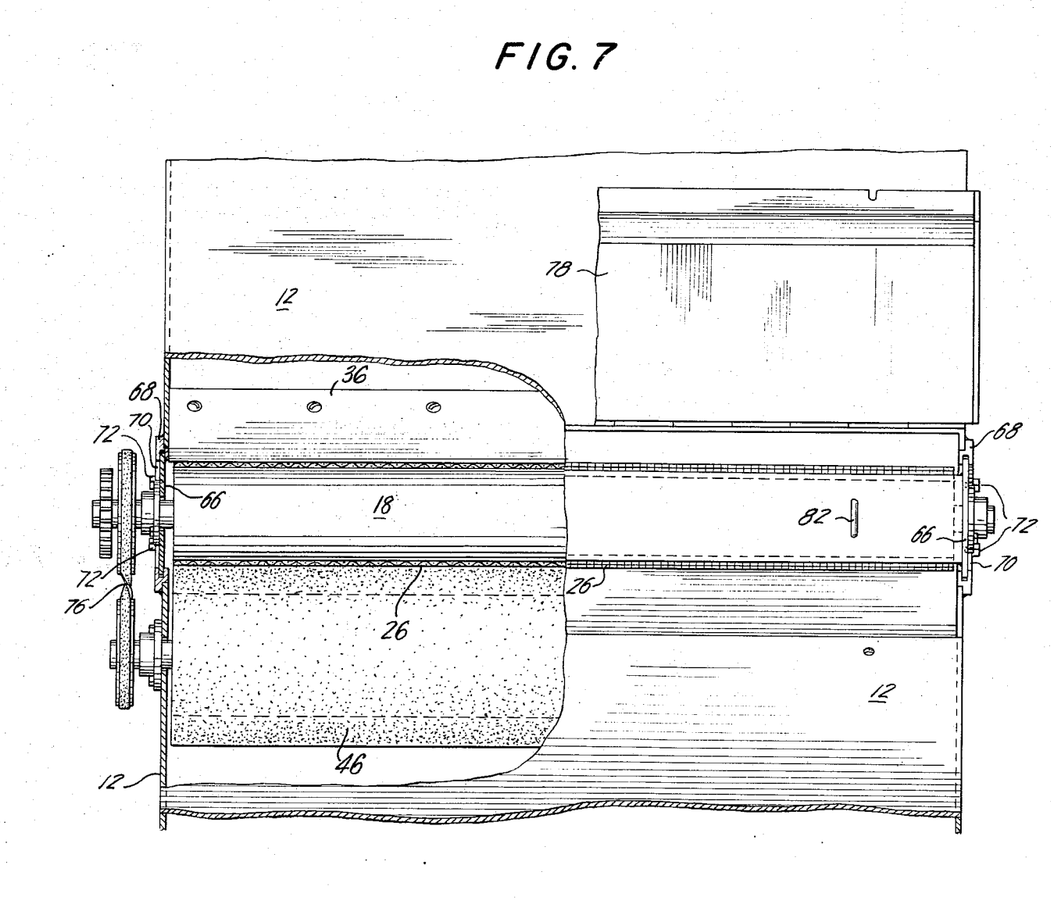
FIG. 7 is a top view, partly in cross-section, of the material separating device shown in FIG. 6.

FIGS. 6 and 7 show a further feature of the present invention whereby the endless belt may be quickly inserted into or removed from the separating device to permit cleaning, repair or replacement with another belt having openings of a different size. As shown in the drawings, the rollers 18 and 20 are maintained in a spaced-apart relationship by brace members 66 arranged at opposite ends thereof. These brace members are slidably mounted in rails 68 attached to the vertical sides of the duct 12 of the pneumatic conveyor. When in operation, the braces 66 are held in position by a locking device such as plates 70 and bolts 72. The drive motor may be disconnected from the endless belt unit by removing the chain 74 and the belt 76.

The shroud 34 above the separating device is provided with a hinged lid 78 which may be lifted out of the way before removing the endless belt. Handles 80 and 82 are attached to the lid 78 and to the removable endless belt unit to facilitate handling.

It will be understood that the present invention is susceptible to various additional modifications, changes and adaptations as will occur to those skilled in the art. It is therefore intended that the scope of the present invention be limited only by the following claims.

I claim:

1. Apparatus for separating material from a pneumatic conveyor comprising, in combination:
   A. duct means, at least one portion thereof having a rectilinear axis, said duct means having a passageway therethrough for conveying material on a stream of gas; and
   B. separator means, interposed in said duct means at said rectilinear portion, for removing conveyed material from said duct means, said separator means comprising, in combination:
      a. a gas-permeable endless belt having two parallel rectilinear sections of travel arranged to traverse said passageway at an angle of approximately 45° at said rectilinear portion of said duct means, such that material conveyed in said duct means will impinge on one of said rectilinear sections;
      b. drive means for continuously moving said rectilinear sections of said endless belt in opposite directions across said passageway at a speed such that the total speed as well as the component speed of said conveyed material in the direction of said rectilinear axis of said duct means remain substantially constant when said material impinges on said one rectilinear section;
      c. two rotatable roller means of the same diameter, each arranged on opposite sides of said passageway of said duct means, for holding said endless belt in position across said passageway, at least one of said roller means being coupled to, for rotation by, said drive means;
      d. means providing quick-removal of said endless belt comprising, in combination:
         i. brace means arranged at both ends of said two roller means for holding said two roller means in spaced apart relation;
         ii. rail means connected to said duct means adjacent and parallel to each of said brace means for slidably holding said brace means;
         iii. means for locking said brace means in a particular position along said rail means;
         iv. closure means connected to said duct means at one end of said brace means for providing a closable opening for said endless belt, said roller means and said brace means wherein said closure means includes first handle means to facilitate manual opening; and
         v. second handle means, connected to said brace means, to facilitate manual movement of said brace means along said rail means so that said endless belt, said roller means and said brace means may be inserted in and removed from said duct means as a unit;
      e. seal means, arranged at one end of said one rectilinear section of said endless belt, for preventing the flow of gas past said end into or out of said duct means while permitting the removal of material from said duct means by said one rectilinear section, said seal means comprising, in combination:
         i. a first roller, connected to said drive means and arranged to rotate against one side of said one rectilinear section at said one end with a surface speed equal to that of said endless belt, said first roller having a surface made of soft resilient material to prevent the flow of gas between said first roller and said one rectilinear section while permitting the removal of material therebetween; and
         ii. a second roller arranged to roll against the other side of said one rectilinear section of said endless belt at the point opposite said first roller;
      f. wiper means, arranged to contact said surface of said first roller, for scraping material off of said first roller after it has been removed from said passageway; and
      g. suction means for removing particles of material which penetrate said one rectilinear section and do not pass through the other rectilinear section of said endless belt comprising, in combination:
         i. a suction housing arranged between said two rectilinear sections and adjacent to said other rectilinear section of said endless belt; and
         ii. means for establishing a lower pressure in said suction housing relative to the pressure immediately outside of said suction housing, including at least one bypass tube connecting said suction housing with the region of said passageway which is downstream of said endless belt;
   whereby the material conveyed on said stream of gas through said passageway in said duct means impinges on said one side of said one rectilinear section of said endless belt and is conveyed out of said passageway while said stream of gas passes through both of said rectilinear sections of said endless belt and remains in said passageway.

2. Apparatus for separating material from a pneumatic conveyor comprising, in combination:
   A. duct means, at least one portion thereof having a rectilinear axis, said duct means having a passageway therethrough for conveying material on a stream of gas; and
   B. separator means, interposed in said duct means at said rectilinear portion, for removing conveyed material from said duct means, said separator means comprising, in combination:
      a. a gas-permeable endless belt having at least two rectilinear sections of travel arranged to traverse said passageway at said rectilinear portion of said duct means, one of said sections presenting a surface of the belt to a material entrained in a gas flowing in the duct;
      b. drive means, connected to said endless belt for continuously moving said rectilinear sections of said endless belt in opposite directions across said passageway; and
      c. seal means, arranged at the downstream end, relative to the direction of movement of the belt, of said one rectilinear section of said endless belt, for preventing the flow of gas past said end into or out of said duct means while permitting the removal of material from said duct means by said one rectilinear section of said endless belt, said seal means comprising, in combination:

i. a combined seal and outfeed roller arranged to roll in contact with material carried on said surface of said one rectilinear section of said endless belt at said one end, said seal and outfeed roller having a surface made of soft resilient material to substantially prevent the flow of gas between it and said one rectilinear section of said endless belt while permitting the removal of material therebetween, and means coupled to said seal and outfeed roller and operative independently of engagement of said seal and outfeed roller with the belt or the material thereon for driving said seal and outfeed roller in rotation to move its surface conjointly with said one section of the belt; and ii. a backup roller arranged to roll against the other side of said one rectilinear section of said endless belt at the point opposite said seal and outfeed roller;

whereby the material conveyed on said stream of gas through said passageway in said duct means impinges on said one side of said one rectilinear section of said endless belt and is conveyed out of said passageway while said stream of gas passes through both of said rectilinear sections of said endless belt and remains in said passageway.

3. The apparatus defined in claim 2, further comprising stationary wiper means, arranged to contact said surface of said seal and outfeed roller, for scraping material off of said seal and outfeed roller after the material has been removed from said passageway.

4. The apparatus defined in claim 2, wherein said duct means is rectangular in cross-section.

5. The apparatus defined in claim 2, wherein said gas is air.

6. The apparatus defined in claim 2, wherein said gas-permeable endless belt is constructed of wire mesh.

7. The apparatus defined in claim 2 further comprising a flexible wiper attached to said duct means and arranged to wipe against said endless belt at an end of a given rectilinear section thereof to form a second seal means for preventing the flow of said stream of gas around the end of said given rectilinear section.

8. The apparatus defined in claim 2, wherein said separator means further comprises suction means for removing particles of material which penetrate said one rectilinear section and do not pass through the other rectilinear section of said endless belt.

9. The apparatus defined in claim 8, wherein said suction means includes a suction housing arranged between said two rectilinear sections and adjacent to said other rectilinear section of said endless belt, and means for establishing a lower pressure in said suction housing relative to the pressure immediately outside of said suction housing.

10. The apparatus defined in claim 9, wherein said means for establishing a lower pressure includes at least one bypass tube, connecting said suction housing with the region of said passageway which is downstream of said endless belt.

11. The apparatus defined in claim 2, wherein said one rectilinear section of said endless belt, intersects said rectilinear axis of said duct means at an angle which lies in the range of 20° – 80°.

12. The apparatus defined in claim 11, wherein said one rectilinear section intersects said rectilinear axis at an angle of approximately 45°.

13. The apparatus defined in claim 11, wherein said drive means moves said one rectilinear section at a speed such that the total speed as well as the component of speed of said conveyed material in the direction of said rectilinear axis of said duct means remain substantially constant when said material impinges on said one rectilinear section.

14. The apparatus defined in claim 2, further comprising two rotatable roller means, each arranged on opposite sides of said passageway of said duct means, for holding said endless belt in position across said passageway.

15. The apparatus defined in claim 14, wherein said two roller means have the same diameter and said two rectilinear sections of said endless belt are parallel.

16. The apparatus defined in claim 14, further comprising brace means arranged at both ends of said two roller means for holding said two roller means in a spaced apart relation; rail means connected to said duct means adjacent and parallel to each of said brace means for slidably holding said brace means; means for locking said brace means in a particular position along said rail means and means for coupling said drive means to at least one of said roller means, whereby said endless belt, said two roller means and said brace means may be inserted in and removed from said duct means as a unit.

* * * * *